Feb. 1, 1944.  C. W. LANGE  2,340,669

DYNAMOELECTRIC MACHINE

Filed Oct. 12, 1942

Inventor:
Carl W. Lange
by Harry E. Dunham
His Attorney.

Patented Feb. 1, 1944

2,340,669

UNITED STATES PATENT OFFICE 2,340,669

DYNAMOELECTRIC MACHINE

Carl W. Lange, Erie, Pa., assignor to General Electric Company, a corporation of New York Application October 12, 1942, Serial No. 461,735

10 Claims. (Cl. 171—252)

My invention relates to dynamo-electric machines and more particularly to an improved construction of a magnetic field excitation system for such machines.

An object of my invention is to provide an improved dynamo-electric machine magnetic field excitation system.

Another object of my invention is to provide an improved laminated salient pole piece for a dynamo-electric machine with an improved armature reaction damping construction.

A further object of my invention is to provide an improved dynamo-electric machine utilizing the laminated magnetic pole piece core structure as part of a damping winding for minimizing the effects of armature reaction on the excitation of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
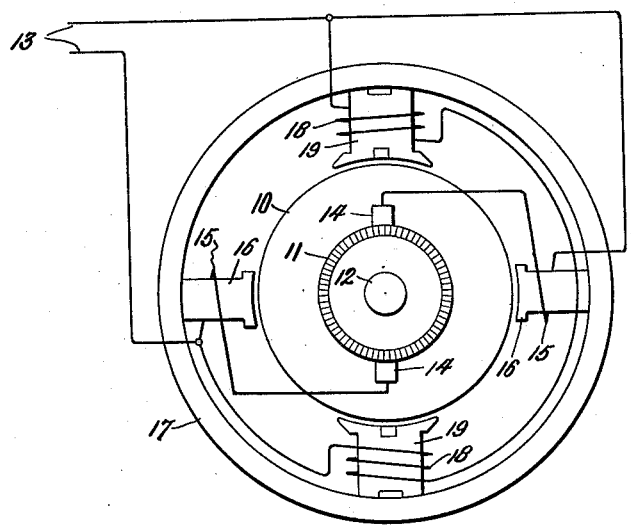
Figure 2:
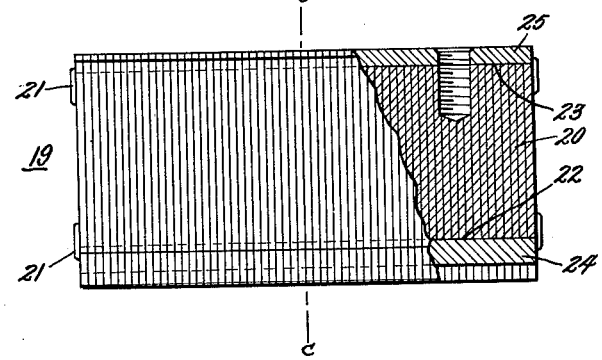
Figure 3:
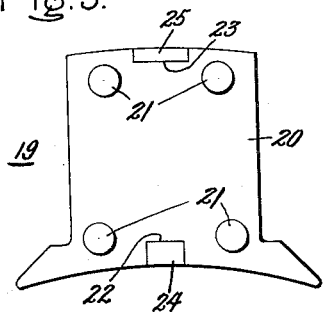

In the drawing, Fig. 1 is a schematic diagram of a dynamo-electric machine provided with an embodiment of my invention; Fig. 2 is a side elevational view, partly broken away, showing the embodiment of my invention illustrated in Fig. 1; and Fig. 3 is an end view of the pole piece shown in Fig. 2.

Referring to the drawing, I have shown my invention in connection with a dynamo-electric machine having a rotatable member or armature 10 provided with a suitable winding connected to a commutator 11 and rotatably mounted on a shaft 12. Electrical power is adapted to be supplied to the machine from a source of electrical power supply 13, which is connected to the armature commutator 11 through brushes 14 connected in series with commutating field exciting windings 15 arranged about commutating pole pieces 16 mounted on a frame 17 of magnetic material which forms part of the stationary member of the machine. The main excitation of the machine is provided by main field exciting windings 18 shown connected in shunt across the same source of electrical power supply 13 as for the armature, but these windings 18 can be connected in shunt across a separate source of electrical power supply, or they can be connected in any other suitable manner, or any other suitable combination of windings can be used and arranged about main salient pole pieces 19, which also are secured to the stationary member frame 17 by any suitable means. These salient pole pieces are formed of laminations 20 of magnetic material which extend substantially transversely of the axis of the machine. Rivets 21 extend through the laminations 20 and retain them in assembled relationship.

Various arrangements have been proposed for minimizing the effects of armature reaction upon the excitation of a dynamo-electric machine and, in general, damping coils or pole face windings have been provided which link the main field flux as well as the flux resulting from armature reaction. In my improved construction, I provide a short-circuited damping coil arranged about the main pole pieces which minimizes the effects of armature reaction on the excitation of the machine, with substantially no effect on the main excitation thereof. This is accomplished by arranging the damping winding substantially parallel to the main field flux such that it links substantially all the flux due to cross armature reaction and substantially none of the main field flux. In the illustrated embodiment of my invention, the laminated pole pieces are provided with grooves in the inner and outer faces thereof which extend transversely of the laminations; that is, a groove 22 is formed in the pole face adjacent the armature and a groove 23 is formed in the pole face adjacent the frame 17. These grooves extend substantially axially of the machine and are filled with deposited magnetic material welded to the laminations 20 to provide a good electrical contact with substantially all of these laminations. After the two grooves have been filled with welding material, the faces of each pole piece are finished in any suitable manner to provide the desired surface thereto. With this construction, the cross component of armature reaction flux links a short-circuited winding, one side of which is formed by the welded electrically conductive element 24 of magnetic material deposited in the groove 22, another side of which is formed by the welded electrically conductive element 25 of magnetic material deposited in the groove 23, and the two other sides of which are formed by the laminations 20. Thus, any variations in the cross-magnetizing armature reaction induce voltages in this short-circuited electrical circuit or coil which tend to cause currents to circulate through the damping circuit or coil side 24 shown in Fig. 2 up through the laminations 20 substantially at one side of the centerline c—c of the pole piece, through the damping circuit or coil side 25, and down through the laminations 20 substantially at the other side of the centerline c—c of the pole piece. This provides a flux transversely of the pole pieces which is substantially equal and opposite to the cross component of armature reaction, and thereby minimizes its effect on the excitation of the machine without producing any effect on the main excitation of the main pole pieces. Furthermore, since the magnetomotive force of these damping coils is substantially in the same direction as that of the commutating pole pieces 16, it assists in producing the desired commutating magnetomotive force in the machine. In addition, sudden load current changes in the armature will induce damping voltages and corresponding damping currents in the damping circuit or coil formed by the laminations 20 and the coil sides 24 and 25 so as to produce a retarding or delaying magnetomotive force which opposes the sudden changes in armature reaction corresponding to the sudden load current changes. This compensates in part for the hysteresis lag in the magnetic material of the commutating poles 16 and of the frame 17 in responding to these sudden changes in the armature current which flows through the commutating field exciting windings, such that changes in the commutating field magnetic flux occur more nearly in step with corresponding changes in the armature reaction magnetic flux, thereby further improving the commutation of the machine. This has actually been found to be the case even under steady state load conditions. With such a construction, the air gap reluctance of the pole pieces remains substantially unaffected, as the welded magnetic material forming the sides 24 and 25 of the damping coil provides substantially the same magnetic reluctance to the main field flux as do the laminations 20. If desired, the groove 23 and the damping coil side 25 might be omitted and the laminations 20 of the pole pieces secured to the frame 17 in good electrical contact therewith such that the frame 17 forms the fourth side of the damping coil. In the construction shown in the drawing, the frame 17 also may carry a certain part of the damping current if the pole piece laminations 20 form a sufficiently good electrical contact with the frame.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a rotatable member and a stationary member with laminated salient pole pieces, a field exciting winding for said pole pieces, and an electrically conductive element of magnetic material welded in the inner and outer faces of said pole pieces substantially axially of said machine and in good electrical contact with the laminations of said pole pieces.

2. A dynamo-electric machine having a rotatable member and a stationary member, salient pole pieces on one of said members formed of laminations of magnetic material extending substantially transversely of the axis of said one member, a field exciting winding for said pole pieces, a slot extending substantially axially of said machine in the inner and outer faces of said pole piece laminations, and an electrically conductive element in said slots electrically connected to said laminations.

3. A dynamo-electric machine having a rotatable member and a stationary member, salient pole pieces on one of said members formed of laminations of magnetic material extending substantially transversely of the axis of said one member, a field exciting winding for said pole pieces, a slot extending substantially axially of said machine in the inner and outer faces of said pole piece laminations, and an element of magnetic material in said slots electrically connected to substantially all of the laminations of each respective pole piece.

4. A dynamo-electric machine having a rotatable member and a stationary member with laminated salient pole pieces, a field exciting winding for said pole pieces, and means including an electrically conductive element of deposited welded material in the inner and outer faces of said pole pieces substantially axially of said machine and in good electrical contact with the laminations of said pole pieces for minimizing the effects of armature reaction on the excitation of said machine.

5. A dynamo-electric machine having a rotatable member and a stationary member with laminated salient pole pieces, a field exciting winding for said pole pieces, and means including an electrically conductive element of magnetic material welded in the inner and outer faces of said pole pieces substantially axially of said machine in good electrical contact with the laminations of said pole pieces for minimizing the effects of armature reaction on the excitation of said machine with substantially no effect on the main excitation of the machine.

6. A dynamo-electric machine having a rotatable member and a stationary member, salient pole pieces on one of said members formed of laminations extending substantially transversely of the axis of said one member, a field exciting winding for said pole pieces, and means including an element of magnetic material welded in the inner and outer faces of said pole pieces substantially axially of said machine and in good electrical contact with said pole piece laminations for minimizing the effects of armature reaction on the excitation of said machine with substantially no effect on the main excitation of the machine.

7. A dynamo-electric machine having a rotatable member and a stationary member with laminated salient pole pieces, a field exciting winding for said pole pieces, and means including an electrically conductive element of magnetic material welded in the inner and outer faces of said pole pieces substantially axially of said machine and in good electrical contact with the laminations of said pole pieces forming therewith a short-circuited damping coil parallel to the axis of the main excitation of the machine for minimizing the effects of armature reaction on the excitation of said machine.

8. A dynamo-electric machine having a rotatable member and a stationary member, a frame of magnetic material and salient pole pieces secured to said frame on one of said members, said pole pieces being formed of laminations of magnetic material extending substantially transversely of the axis of said one member, a field exciting winding for said pole pieces, and means including an element of magnetic material welded to the faces of said pole pieces away from said frame and substantially axially of said machine in good electrical contact with said pole piece laminations for minimizing the effects of armature reaction on the excitation of said machine with substantially no effect on the main excitation of the machine or on the air gap reluctance of said pole pieces, said welded material forming a side of a coil, said laminations forming two other sides of said coil electrically connected to said welded material, and said frame being arranged to provide an electrical connection with said laminations and being adapted to carry current circulated through said laminations and said welded material sides of said coil.

9. A laminated salient pole piece of magnetic material for a dynamo-electric machine, a field exciting winding for said pole piece, and means including an electrically conductive element of deposited welded material transversely of the laminations in the inner and outer faces of said pole piece.

10. A salient pole piece for a dynamo-electric machine formed of laminations of magnetic material, a field exciting winding arranged about said pole piece, a slot extending transversely through the inner and outer faces of said pole piece laminations, and an element of magnetic material in said slots electrically connected to substantially all of said laminations.

CARL W. LANGE.